(12) United States Patent
Ahmed

(10) Patent No.: US 8,521,723 B1
(45) Date of Patent: Aug. 27, 2013

(54) TRANSFORMING CORRELATED SCALAR SUBQUERIES

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/552,419

(22) Filed: Jul. 18, 2012

(51) Int. Cl.
G06F 17/30 (2006.01)
G06F 7/00 (2006.01)

(52) U.S. Cl.
USPC .......................................... 707/714; 707/802

(58) Field of Classification Search
USPC ................................................ 707/714, 802
See application file for complete search history.

(56) References Cited

U.S. PATENT DOCUMENTS

| | | | |
|---|---|---|---|
| 6,615,203 B1 * | 9/2003 | Lin et al. | 1/1 |
| 2004/0220923 A1 * | 11/2004 | Nica | 707/3 |
| 2005/0097099 A1 * | 5/2005 | Kapoor et al. | 707/3 |
| 2006/0230017 A1 * | 10/2006 | Larson et al. | 707/2 |

OTHER PUBLICATIONS

U.S. Appl. No. 13/481,722, filed May 25, 2012, Notice of Allowance, mailed Jun. 11, 2013.

\* cited by examiner

*Primary Examiner* — Kuen Lu
(74) *Attorney, Agent, or Firm* — Hickman Palermo Truong Becker Bingham Wong LLP

(57) ABSTRACT

A method, apparatus, and stored instructions are provided for transforming an initial query having a scalar subquery with correlated predicates into a transformed query having transformed predicates that are not in the scalar subquery. The transformed predicates correspond to the correlated predicates, but the transformed predicates are no longer correlated. The transformed predicates reference an outer join operation to preserve null values that may have been generated by the correlated predicates that were in the scalar subquery of the initial query. The transformed query is semantically equivalent to the initial query. When creating an execution plan for the transformed query, the query processor may choose from a much larger set of access paths, join methods, and join permutations than those that were available for the initial query. The transformed query may qualify for other transformations or optimizations, or may otherwise be executed or optimized differently from the initial query.

32 Claims, 3 Drawing Sheets

TRANSFORMING CORRELATED SCALAR SUBQUERIES

CROSS-REFERENCE TO RELATED APPLICATIONS

This application is related to U.S. patent application entitled, "TRANSFORMING A SINGLE-TABLE JOIN PREDICATE INTO A PSEUDO-JOIN PREDICATE," U.S. Ser. No. 13/481,722, filed on May 25, 2012 by Rafi Ahmed, the contents of which is hereby incorporated by reference herein in its entirety. This application is also related to U.S. patent application entitled, "TECHNIQUE OF DECORRELATION OF LATERAL VIEWS," U.S. Ser. No. 13/491,391, filed on Jun. 7, 2012 by Rafi Ahmed, the contents of which is hereby incorporated by reference herein in its entirety.

FIELD OF THE INVENTION

The technical field relates to rewriting and optimizing queries.

BACKGROUND

Query Processing

A query is an expression, command, or set of commands that, when executed, causes a server to perform an operation on a set of data. A query may specify a join operation that combines rows from two or more sources, such as tables, views, or snapshots. In the context of database systems, a join is performed whenever multiple tables ("base or view tables") appear in a FROM clause of a query. For some join operations, the first table in the join operation may be called the "left table," and the second table in the join operation may be called the "right table." The join operation produces a result set that may be stored temporarily, used in evaluating other queries, or written as a new table in a database. The result set may often be stored temporarily so that other parts of the query may select data from the result set.

A query may be processed in a predictable order by query processors. For example, the order of precedence may be FROM, WHERE, GROUP BY, HAVING, SELECT, and ORDER BY. Query processors may vary the order if varying the order is predicted to be more efficient as long as the varying the order would not change a result of the query.

The rows on which a join operation is to be performed or the result of performing a join operation may be reduced or filtered if there are such predicates in a WHERE clause of the query. Filters in the WHERE clause may have been specified by a user who authored the query or may result from transformations performed by a query optimizer. Filter predicates such as these that are performed separately from the join operation are called "filter predicates." Filter predicates remove rows if the rows do not satisfy the filter predicate conditions. For example, a filter predicate may remove rows for employees that are not in department 3. The conditions in the filter predicate may be related to each other with logical operators such as AND (for "conjunctive predicates") or OR (for "disjunctive predicates"). The application of filter predicates may cause certain types of results to remain in the result set, such as results that would be included for an inner join (removal of non-matching rows from the left and right tables), a left outer join (removal of non-matching rows from the right table), a right outer join (removal of non-matching rows from the left table), or a subset of the separately joined rows.

A join predicate identifies condition(s) on which a join operation is based. Join predicates are applied as the join operation is being performed rather than being applied before or after the join operation has been performed. The join predicate may be specified in an ON clause as shown in example Queries 2, 3, and 5 below or in a WHERE clause as shown in example Queries 7, 8, and 9. Unlike filter predicates, join predicates are used to combine or join two tables. Based on whether or not the row satisfies the join predicate, the row may be included in, duplicated, excluded from, or null-padded. The evaluation of complex join predicates may be computationally expensive because join predicates are re-evaluated for each row that is joined.

In query optimization, a query optimizer or other query processor may transform queries from one form to another form as long as the two forms are semantically equivalent to each other. As used herein, a query is "transformed" when the query is (a) rewritten from a first form to a second form, (b) received in a manner that specifies a first set of operations, such as a first form or a first execution plan, and executed using a second set of operations, such as the operations specified by a second form or second execution plan, or (c) received in a manner that specifies a first set of operations, and planned for execution using a second set of operations. An execution plan is a set of directives, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

Join Operations

The manner in which tables are joined can affect the outcome of the query. Example types of join operations include inner join, left outer join, right outer join, full outer join, natural join, and cross join. Example methods of join include hash, sort-merge, index access, and nested-loops joins. The method used for joining two tables does not affect the outcome of the query. The type of join operation may be specified in the FROM clause or in the WHERE clause of the query. The method of join is generally left up to the query optimizer to determine, for example, based on a cost-analysis of the methods available for the query.

A cross-join produces a result set that is a Cartesian product of all rows in the sources. In other words, for a cross-join of T1 and T2, every row in source table T1 would be combined with every row of source table T2. Computing the Cartesian product is an expensive operation that uses an order of n*m resources to compute, where n is the number of rows in table T1 and m is the number of rows in table T2.

If the specified type of join is not a cross-join, computation of the join operation may avoid the complex computation of a Cartesian product of all rows in the sources. Many database systems support American National Standards Institute (ANSI) syntax for specifying types of joins that are performed on the tables. Different types of joins often produce different result sets by including, duplicating, excluding, or null-padding different sets of rows from the sources. A row is said to be "null-padded" if values in the row are changed to null. A row may be null-padded if the row is included in the result set even though the row does not satisfy a join predicate.

For example, an inner join produces a result set that includes only the matching rows (i.e., the rows that satisfy the predicate). An example syntax for an inner join is provided in Query 1 below.

Query 1: Example Syntax for an Inner Join
SELECT T1.SSN, T1.name, T2.dname
FROM T1, T2
WHERE T1.dno=T2.id;

For inner joins such as this one, the predicate in the WHERE clause may be treated as either a join predicate or a filter predicate—the placement of the predicate does not change the result set. The optimizer may choose to evaluate this query by applying the predicate as part of the join operation or separately from the join operation as a filter predicate on the result of the Cartesian product of the two tables. The join predicate in this example produces the results shown in Table 1, where rows from T1 are said to match rows from T2 if the value of the department number ("dno") column in T1 matches the value of the "id" column in T2. If the rows match, the values for that row from T1 and for that row from T2 are added to the result set.

TABLE 1

ROWS RESULTING FROM AN EXAMPLE INNER JOIN

| COLUMN(S) FROM T1 | COLUMN(S) FROM T2 |
|---|---|
| ROWS FROM T1 AND T2 THAT MATCH | |

Query 2 uses the ANSI syntax "INNER JOIN" to signal the inner join, but Query 2 is semantically equivalent to Query 1—the two queries, if executed, would produce the same result set that is shown in Table 1.

Query 2: Example Syntax for the Inner Join
SELECT T1.SSN, T1.name, T2.dname
FROM T1 INNER JOIN T2
ON T1.dno=T2.id;

A full-outer join is one type of outer join. The full-outer join produces a result set that includes matching rows and null-padded non-matching rows. In other words, rows that do not satisfy the predicate are null-padded rather than excluded altogether. An example syntax for a full outer join is provided in Query 3 below.

Query 3: Example Syntax for a Full Outer Join
SELECT T1.SSN, T1.name, T2.dname
FROM T1 FULL OUTER JOIN T2
ON (T1.dno=T2.id);

Query 3 is not equivalent to Query 1 or Query 2. In Query 3, the "FULL OUTER JOIN" operator signals that the join operation is a full outer join. The join predicate in this example produces the results shown in Table 2, where rows from T1 are said to match rows from T2 if the value of the department number ("dno") column in T1 matches the value of the "id" column in T2. If the rows match, the values from the SSN and name columns for that row from T1 and the department name ("dname") column for that row from T2 are added to the result set. Rows from T1 that do not have a matching row in T2 are also added to the result set, except that the column(s) from T2, such as "dname" in the example, are null-padded for those rows. Similarly, rows from T2 that do not have a matching row in T1 are added to the result set, except that column(s) from T1, such as "SSN" and "name" in the example, are null-padded for those rows. Unlike inner joins, rows from T1 that do not have a matching row in T2 are added to the result set as null-appended rows. Also unlike inner joins, rows from T2 that do not have a matching row in T1 are added to the result set as null-appended rows.

TABLE 2

ROWS RESULTING FROM AN EXAMPLE FULL OUTER JOIN

| COLUMN(S) FROM T1 | COLUMN(S) FROM T2 |
|---|---|
| ROWS FROM T1 THAT DO NOT MATCH T2 | NULL VALUES |
| ROWS FROM T1 AND T2 THAT MATCH | |
| NULL VALUES | ROWS FROM T2 THAT DO NOT MATCH T1 |

A left outer join is another type of outer join. The left outer join produces a result set that includes matching rows and null-padded non-matching rows for the left table but not for the right table. In other words, rows from the left table that do not satisfy the join predicate are null-padded; whereas, rows that do not satisfy the predicate in the right table are excluded. An example syntax for a Oracle native left outer join is provided in Query 4 below, where the left outer join is signaled by the native Oracle operator, "(+)".

Query 4: Example Syntax for a Left Outer Join
SELECT T1.SSN, T1.name, T2.dname
FROM T1, T2 WHERE T1.dno=T2.id (+)

Query 4 is not semantically equivalent to any of Queries 1-3. The join predicate in this example produces the results shown in Table 3, where rows from T1 are said to match rows from T2 if the value of the department number ("dno") column in T1 matches the value of the "id" column in T2. If the rows match, the values for that row from T1 and for that row from T2 are added to the result set. Rows from T1 that do not have a matching row in T2 are also added to the result set, except that the column(s) from T2, such as "dname" in the example, are null-padded for those rows. Unlike a full outer join, rows from T2 that do not have a matching row in T1 are not added to the result set.

TABLE 3

ROWS RESULTING FROM AN EXAMPLE LEFT OUTER JOIN

| COLUMN(S) FROM T1 | COLUMN(S) FROM T2 |
|---|---|
| ROWS FROM T1 THAT DO NOT MATCH T2 | NULL VALUES |
| ROWS FROM T1 AND T2 THAT MATCH | |

Query 5 uses the ANSI syntax for "LEFT OUTER JOIN" to signal the left outer join, but Query 5 is semantically equivalent to Query 4—the two queries, if executed, would produce the same result set that is shown in Table 3. Queries 4 and 5 are not semantically equivalent to Queries 1-3.

Query 5: Example Syntax for the Left Outer Join
SELECT T1.SSN, T1.name, T2.dname
FROM T1 LEFT OUTER JOIN T2
ON T1.dno=T2.id;

Views

A view is a database object that is defined by an expression that references other database objects. A view may be looked upon as a predefined or inline query. The view may be an in-line view that is defined by an inner query that is nested within another query. Query 6 is an example query with an in-line view.

Query 6: Example Query with an in-Line View
SELECT V1.x
FROM (SELECT T1.x AS x FROM T1 WHERE T1.y>5) V1;

Alternatively, the view may be an external view that is defined outside of the query. Query 7 is an example query with an external view.

Query 7: Example Query with an External View
CREATE VIEW V1 AS SELECT T1.x AS x FROM T1 WHERE T1.y>5;
SELECT V1.x FROM V1;

Scalar Subqueries

A scalar subquery is a subquery that returns at most one row that contains exactly one data item. Such a subquery may appear in the select clause of an outer query. When the subquery returns a row, then that row contains exactly one data item. The subquery may not return anything, if the subquery WHERE clauses evaluate to FALSE. A scalar subquery in the SELECT clause, unlike WHERE clause subqueries, is evaluated after all of the joins in the outer query have taken place. If a query execution engine determines that the scalar subquery, if executed, would return more than one row, then the query execution engine receiving the outer query may return an error message rather than executing the outer query. The query execution engine may assume that the scalar subquery will return at most one row, and return the error message if the query, when executed, returns more than one row.

For example, a SUM( ) or AVG( ) function returns exactly one item, i.e., the sum or average of the values on which the respective function is evaluated. In special cases, an AVG( ) or SUM( ) of zero rows or all null rows is a null value, and an AVG or SUM equal to zero means that non-null values averaged or summed to zero, respectively.

Scalar subqueries may include complex correlating join conditions, contain aggregation, or reference multiple tables. For example, a scalar subquery may contain a correlated predicate. A "correlated predicate" is a predicate in a query block, such as a subquery, that refers to a correlated column that occurs outside of the query block. For example, a correlated predicate in a subquery may reference the other table(s) that appear in the FROM clause of an outer query.

Queries with such complex scalar subqueries are not mergeable or unnestable and are executed using one row at-a-time evaluation method, which is similar to the nested-loop join method. No join methods such as hash and sort-merge cannot be used for evaluating queries with these complex scalar subqueries. When doing actual join, the nested-loop join method is executed using two nested loops. For a nested-loop join of example tables T1 and T2, an outer loop of the join operation may iterate on records of T1, and an inner loop of the join operation may iterate on records of T2. Computing a nested loop join uses an order of n*m resources to compute, where n is the number of rows in table T1 and m is the number of rows in table T2. Also, an unmerged scalar subquery cannot use a native join operator such as "(+)"; thus, a query containing an unmerged scalar subquery is executed using an evaluation method, which bears a close resemblance to the nested-loop join method, and which is often effectively equivalent to the computationally expensive cross join operation.

Query 8 is an example query with a scalar subquery. In the example, the correlated predicates, "T3.d=T1.d" and "T4.e=T2.e", reference tables T1 and T2 that appear in the FROM clause of an outer block of example Query 8. The outer block of example Query 8 is shown with less indentation.

Query 8: Example Query with a Scalar Subquery
SELECT T1.a, (SELECT AVG(T3.c)
   FROM T3, T4
   WHERE T3.d=T1.d and
   T4.e=T2.e and
   T4.b=T3.b)
FROM T1, T2, T5
WHERE T1.x=T2.x and T2.z=T5.z;

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
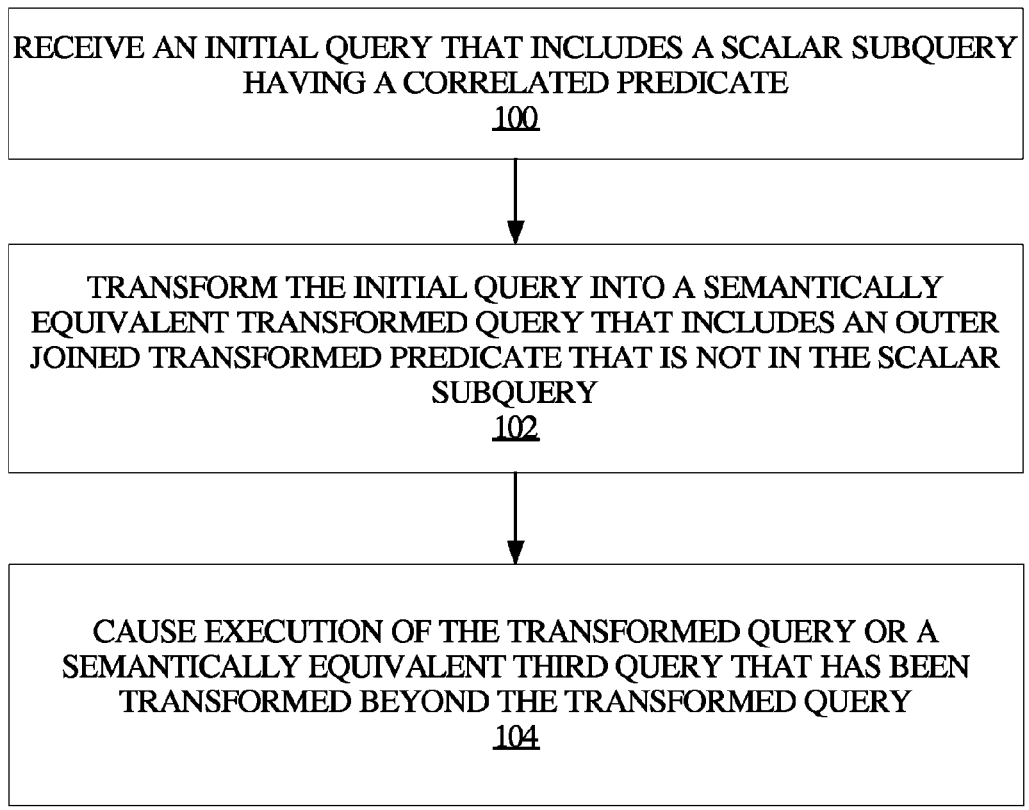
FIG. 1 illustrates an example process for transforming a query by removing a correlated scalar subquery.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transforming a query by removing a correlated select-list scalar subquery, which returns at most one row. A select-list scalar subquery is a subquery that appears in the SELECT clause of the (outer) query. In other words, the subquery is treated as scalar value that is selected by the outer query. The subquery is correlated when the subquery references database objects that are outside of the subquery. In one embodiment, a query processor such as an optimizer or execution engine transforms an initial query having a scalar subquery with correlated predicate(s) into a transformed query having transformed predicate(s) that are not in the scalar subquery. The transformed predicate(s) correspond to the correlated predicate(s), but the transformed predicate(s) are no longer correlated. In other words, the transformed predicate(s) reference only those database objects that are introduced in a same query block as the transformed predicate(s). The transformed predicate(s) reference an outer join operation to preserve null values that may have been generated by the correlated predicate(s) that were in the scalar subquery of the initial query. The scalar subquery in the initial query may include many correlated predicates, and the transformed query might not include any of the correlated predicates. Instead, the transformed query may include corresponding predicates that are no longer correlated. The transformed query is semantically equivalent to the initial query.

When creating an execution plan for the transformed query without the correlated scalar subquery, the query processor may choose from a much larger set of access paths, join methods, and join permutations than those that were available for the initial query. For example, the query processor may choose join methods other than the nested loops join method. The transformed query without the correlated scalar subquery may also qualify for other transformations or optimizations, or may otherwise be executed or optimized differently from the initial query with the correlated scalar subquery.

The scalar subquery, if executed in the initial query, would return at most one row containing a single data item. For example, the single data item may be the value of a single cell that is in a single row and a single column of a table. The transformed query, if executed, preserves a result that would have been produced by the initial query that included the scalar subquery, even if the scalar subquery has been removed from the transformed query. In one embodiment, the initial query selects a result of the scalar subquery. For example, the initial query may include an outer query block that selects a single data item that results from the scalar subquery. In other words, the scalar subquery may appear in the SELECT clause of the outer query.

The scalar subquery in the initial query includes a correlated predicate that references a particular database object such as a particular column or table that is outside the scalar subquery. The transformed query, if executed, may cause a temporary organization of data from the particular database object and utilization of the temporary organization of data to evaluate multiple rows of a join operation as part of determining the single data item that would have resulted from the scalar subquery. The initial query, if executed, could not have used the temporary organization of data to evaluate multiple rows of a join operation in the scalar subquery. The transformed query, when executed, avoids repeated scans of the subquery tables, and the join operation that was specified by the scalar subquery can be parallelized during execution of the transformed query. Further, transformed predicates outside of the scalar subquery can be evaluated as part of the join operation even though SELECT clause subqueries would otherwise be evaluated after all the joins in the outer query have taken place.

In one embodiment, the query processor receives the initial query for execution and, in response, generates an execution plan for executing the transformed query instead of the initial query. In another embodiment, the query processor receives the initial query for execution and, in response, executes the transformed query instead of the initial query.

The query processor may determine whether a subquery is guaranteed to return at most one row before the query optimizer transforms a query containing the subquery using the scalar subquery transformation techniques described herein. If the subquery is guaranteed to return at most one row, the query processor may treat the subquery as a scalar subquery and apply the scalar subquery transformation techniques.

The query processor may also determine whether the scalar subquery includes any correlated predicates before transforming the initial query. If the scalar subquery of the initial query does not include any correlated predicates, in one embodiment, the query processor determines not to transform the query and not to remove the scalar subquery. Even without a transformation, uncorrelated columns referenced by a scalar subquery could be loaded and organized once, and the temporary organization of data could be re-used when evaluating multiple rows of a join operation and selecting from those rows to determine the scalar value that results from the scalar subquery.

In one embodiment, even if the scalar subquery is correlated, the query processor performs a cost analysis to determine whether or not to transform the scalar subquery. As part of the cost analysis, the query processor may compare estimated execution costs for different possible transformations of the initial query, as well as an execution cost for the initial query itself. The query processor may determine not to transform the query if the initial query is either less costly to execute or if the estimated cost savings is below a threshold amount. The query processor may also limit the cost of the cost analysis itself by limiting the number of different possible transformations that are considered and/or the amount of time consumed considering different possible transformations.

In one embodiment, transforming the initial query to the transformed query includes adding a view to the initial query. Alternatively, a table coming from the subquery may be added and referenced in the initial query. The correlated predicate(s) in the initial query may reference uncorrelated column(s) in addition to the correlated column(s) that are referenced. The uncorrelated column(s) may be defined as columns of the view in the transformed query. The transformed predicate(s) may reference these columns of the view.

In the same or a different embodiment, the scalar subquery includes an aggregation operator. To account for the aggregation operator, transforming the initial query to the transformed query includes adding a view with a GROUP BY clause. Local column(s) referenced by the correlated predicate(s) in the initial query are defined as columns of the view in the transformed query. The transformed predicate(s) reference these columns of the view, and the GROUP BY clause in the transformed query groups on these columns to preserve the effect that the aggregation operator and correlated predicates produced in the initial query.

The techniques may be implemented as steps that are performed by computing device(s). The computing device(s) may be specially configured to perform the steps, for example, by including specialized hardware and/or specialized software. Alternatively, one or more non-transitory computer-readable media may store specialized instructions for causing computing device(s) to perform the steps.

FIG. 1 illustrates an example process for transforming a query by removing a correlated scalar subquery. The process may be carried out by computing device(s) that are specially configured to perform the steps. In the example, an initial query is received in step 100. The initial query includes a scalar subquery having a correlated predicate. In step 102, the initial query is transformed into a semantically equivalent transformed query that includes an outer joined transformed predicate that is not in the scalar subquery. In step 104, execution is caused for the transformed query or for a semantically equivalent third query that has been transformed beyond the transformed query.

Figure 2:
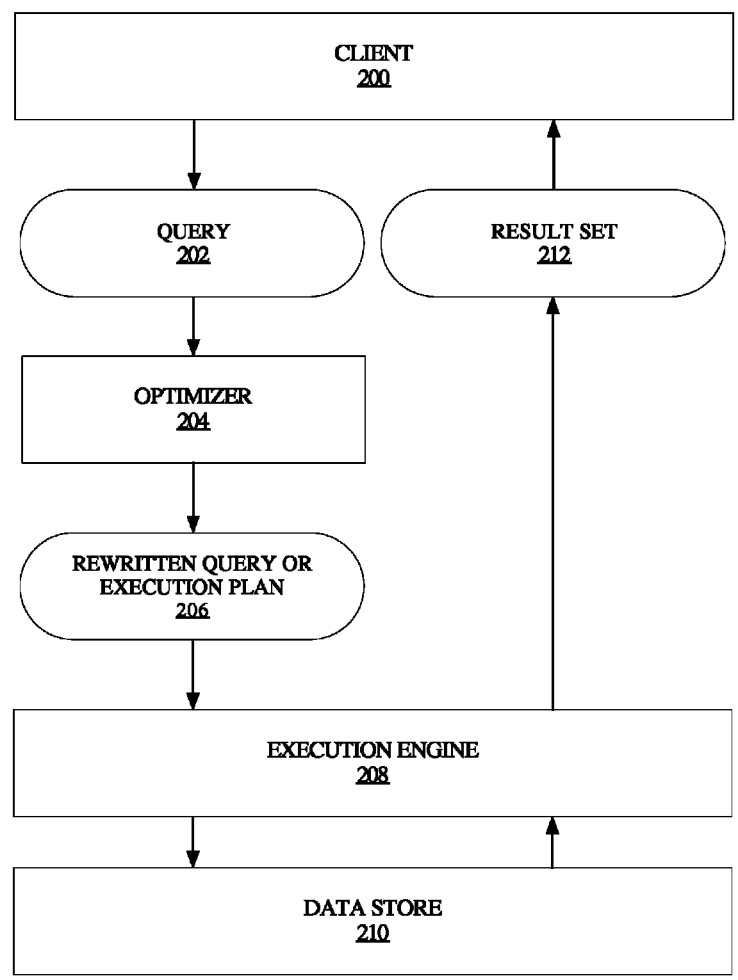
FIG. 2 illustrates an example server-client system for transforming and executing a query.

FIG. 2 illustrates an example server-client system for transforming and executing a query. In the example, client 200 sends a query 202 to optimizer 204. As shown, optimizer 204 is separate from execution engine 208. Optimizer 204 and execution engine 208 may operate on same or different devices and may have a high amount or low amount of integration with each other. Optimizer 204 rewrites the query or generates an execution plan that is based on the query or a transformation of the query. Optimizer sends the rewritten query or execution plan 206 to execution engine 208. Execution engine 208 then executes the rewritten query or execution plan 206 against data store 210 and returns result set 212 to client 200.

Examples of Removing a Correlated Scalar Subquery

High-level concepts have been described for transforming a query by removing a correlated scalar subquery. Specific examples are provided herein to reinforce and deepen an understanding of these high-level concepts. However, the high-level concepts are not limited by these specific examples.

In various examples, an initial query with a scalar subquery in a SELECT clause is transformed into a transformed query without the scalar subquery in the SELECT clause. In the examples, the scalar subquery includes a correlated predicate that specifies condition that is satisfied when a value of a correlated column is equal to a value of an uncorrelated column.

Query 8 shows an example query that includes a scalar subquery with correlated predicates.

Query 8: Example Query with a Scalar Subquery

```
SELECT T1.a, (SELECT AVG(T3.c)
   FROM T3, T4
   WHERE T3.d=T1.d and
   T4.e=T2.e and
   T4.b=T3.b)
FROM T1, T2, T5
   WHERE T1.x=T2.x and T2.z=T5.z;
```

Query 8 may be transformed into example Query 9, which does not include the scalar subquery.

Query 9: Example Transformation of Query 8
```
SELECT T1.a, V.t3_avg
FROM T1, T2, T5,
   (SELECT AVG(T3.c) t3_avg, T3.d as d, T4.e as e
   FROM T3, T4
   WHERE T4.b=T3.b
   GROUP BY T3.d, T4.e) V
WHERE T1.x=T2.x and T2.z=T5.z and
T1.d=V.d (+) and T2.e=V.e (+);
```

As part of a transformation from Query 8 to Query 9, correlated predicates are converted into non-correlated join predicates. For example, the correlated predicates, "T3.d=T1.d" and "T4.e=T2.e," of the scalar subquery in Query 8 are placed in the WHERE clause in Query 9, and a view in Query 9 replaces the scalar subquery in Query 8. References to the uncorrelated columns, "T3.d" and "T4.e," which appear in the correlated predicates of Query 8, are transformed into references, "V.d" and "V.e" of corresponding columns of the view in transformed predicates, "T1.d=V.d (+)" and "T2.e=V.e(+)", of Query 9. An outer join condition, signaled by the native outer join operator, "(+)", appears in the transformed predicates to preserve an effect of null appended rows that was in Query 8.

Also as part of the transformation from Query 8 to Query 9, a GROUP BY clause is added to the view of Query 9, and the GROUP BY clause groups the view based on the columns, T3.d and T4.3, that are also referenced via the view by the transformed predicates.

As part of transforming the scalar subquery of Query 8 into the view of Query 9, previously uncorrelated columns, "T3.d" and "T4.e," from previously correlated predicates, "T3.d=T1.d" and "T4.e=T2.e," are defined as columns of the view that can be referenced from outside of the view as "V.d" and "V.e," respectively. The previously correlated predicates are transformed to transformed join predicates outside the view, in the WHERE clause of the outer block of Query 9. The transformed join predicates reference the previously correlated columns, "T1.d" and "T2.e", respectively, and the previously uncorrelated columns, "d" of T3 and "e" of T4, respectively.

These previously uncorrelated columns from Query 8 are defined as columns of the view, "V", in Query 9, and are referenced as "V.d" and V.e", respectively. The definition of these columns, "T3.d" and "T4.e", "as" columns "d" and "e" of the view may be done explicitly, as shown in the example using the "as d" and "as e" notation, or implicitly by virtue of the column names "d" and "e," respectively. The scalar valued result of the scalar subquery from Query 8 is now defined as a column of the view, "t3_avg", in Query 9. The name for such column may be arbitrarily chosen, chosen based on the operation that was performed to obtain the value, and/or chosen based on the table or tables from which the value is based. In the example, the name "t3_avg" is chosen because the scalar value is produced by the average function on table T3. The view in Query 9 is moved to the FROM clause, and the scalar valued result, rather than the scalar subquery itself, is referenced in the SELECT clause of Query 9.

The transformed predicates referencing the view are outer joined with the view such that Query 9 preserves null appended rows that would have existed in the correlated evaluation of the scalar subquery of Query 8. By preserving the null appended rows, Query 9, which includes an outer-joined predicate outside the view, is able to produce an equivalent result as Query 8, which included a corresponding non-outer joined predicate in the scalar subquery.

After the transformation from Query 8 to Query 9, the view is a non-correlated view. Although the view joins tables T3 and T4, rows for these tables may be loaded and organized in temporary storage once at the beginning of execution of the query. Once loaded and organized, this data may be used when performing the join operation to determine, using Query 9, the single-value that would have resulted from the scalar subquery of Query 8. The correlated scalar subquery in Query 8 would have loaded the correlated columns separately for each row of the select statement when determining the result of the scalar subquery. The scalar subquery, when correlated, could not have been used a temporary organization of the correlated columns for evaluation; the values loaded for one row of the correlated column when executing the query block containing the scalar subquery would not have helped a query execution engine when the query execution engine begins evaluating another row of the correlated column.

Query 10 shows another example query that includes a scalar subquery with correlated predicates. Query 10 does not include an aggregate function, but the scalar subquery still, as in Query 8, selects from two or more tables but returns only a single data item. Query 10 is called a scalar subquery even though Query 10 does not include an aggregate function if Query 10, in light of the underlying data, is guaranteed to return a single data item. For example, if there are unique indexes on T4.b and T3.z, then Query 10 may be said to guarantee the return of a single data item.

Query 10: Example Query with a Scalar Subquery
```
SELECT T1.a, (SELECT T3.c
   FROM T3, T4
   WHERE T3.d=T1.d and T4.h=T3.h and
   T4.b=5 and T3.z=77)
FROM T1, T2
WHERE T1.x=T2.x;
```

Query 10 may be transformed into example Query 11, which does not include the scalar subquery.

Query 11: Example Transformation of Query 10
```
SELECT T1.a, V.c
FROM T1, T2, (SELECT T3.c, T3.d as d
   FROM T3, T4
   WHERE T4.h=T3.h and
   T4.b=5 and T3.z=77) V
WHERE T1.x=T2.x and T1.d=V.d (+);
```

Query 10 is transformed into Query 11 by pulling out the correlated predicate, "T3.d=T1.d" to form a transformed predicate "T1.d=V.d(+)" in a WHERE clause of the outer block of Query 11. Also as part of the transformation, the scalar subquery is transformed into a view, "V". The uncorrelated column, "T3.d", referenced by the previously correlated predicate is defined as a column, "d", of the view such that the uncorrelated column may be referenced outside of the view. The transformed predicate may be outer joined with the view to preserve null values that may have been generated during evaluation of Query 8 and to preserve semantic equivalence between the correlated predicate that was in the scalar subquery of Query 8 and the transformed predicate that appears in the WHERE clause of Query 9.

Query 12 shows yet another example query that includes a scalar subquery with correlated predicates. The example of Query 12 does not include an aggregate function, and, unlike in Queries 8 and 10, the scalar subquery selects from a single tables to return the single data item. In Query 12, the scalar subquery "(SELECT T2.c from T2 WHERE T2.y=T1.y)" will return at most a single row, if column T2.y is unique.

Query 12: Example Query with a Scalar Subquery
SELECT T1.a, (SELECT T2.c
  FROM T2
  WHERE T2.y=T1.y)
FROM T1
WHERE T1.x>7;

Query 12 may be transformed into example Query 13, which does not include the scalar subquery.

Query 13: Example Transformation of Query 12
SELECT T1.a
FROM T1, T2
WHERE T1.x>7 and T1.y=T2.y(+);

In order to transform Query 12 to Query 13, the correlated predicate, "T2.y=T1.y", is pulled out of the scalar subquery to form a transformed predicate, "T1.y=T2.y(+)", but the scalar subquery does not need to be transformed into a view. Instead, the scalar subquery is merged with an outer block of the Query 12 such that the single table referenced by the scalar subquery, "T2," now appears in the FROM clause of Query 13 with the original table, T1, that appeared in the FROM clause of Query 12. The transformed predicate is outer joined to preserve null values and preserve semantic equivalence between the correlated predicate that was in the scalar subquery of Query 12 and the transformed predicate that appears in the WHERE clause of the outer block of Query 13.

Join Methods

A query optimizer may choose from among different available join methods to carry out a join operation. As described herein, some join methods are not available to some query formulations.

In a nested loops join method, a join operation is evaluated on a row-by row basis. In other words, during a join of T1 and T2, for each row of T1, the execution engine would scan T2 to determine whether T2 satisfies a join condition for that row.

In an index access join method, the execution engine may utilize indexes that existed in a database before execution of the query or subquery. For example, the database may already include indexes on the columns of T1 and/or T2 that are relevant to the join conditions. The execution engine leverages the index but still looks for these values on a row-by-row basis.

In a sort-merge join method, the execution engine may initially sort data in both of the tables that are being joined. The sorted data may be retained during execution of the query or subquery such that the sorted data does not need to be regenerated for each row. The sorted data may also be destroyed or retained once the query or subquery has been executed. For example, if evaluating an equality condition such as T1.dno=T2.id for a first row of T1 where T1.dno=5, the execution engine may look in the sorted data for T2.id=5. If the execution engine starts at a value below T2.id=5, the execution may save time by stopping the search once the execution engine reaches a value that is greater than T2.id=5. Similarly, if the execution engine starts at a value above T2.id=5, the execution engine may save time by stopping the search once the execution engine reaches a value that is less than T2.id=5.

In a hash join method, the execution engine may initially create a hash table that hashes values of either T1 into a hash bucket or values of T2 into a hash bucket. The hash tables may be retained during execution of the query or subquery such that the hash tables do not need to be regenerated for each row. The hash tables may also be destroyed or retained once the query or subquery has been executed. For example, if evaluating an equality condition such as T1.dno=T2.id for a first row of T1 where T1.dno=5, the execution engine may use a hash table to map T1.dno=5 to hash bucket X. For T2.id=5, the execution engine may be directed to look in the already existing hash bucket X, which may be significantly smaller than T2.

The sort-merge join method and the hash join method both involve a temporary organization of data from the first database object and the second database object, and utilization of the temporary organization of data for evaluation of multiple rows of the join operation. The temporary organization of data may involve the creation of a temporary database object such as a sorted table or a hash table. The temporary database object may be destroyed or retained after the join operation is completed. The nested loops and index access join methods do not create such data during query execution and cannot leverage such data to improve query execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
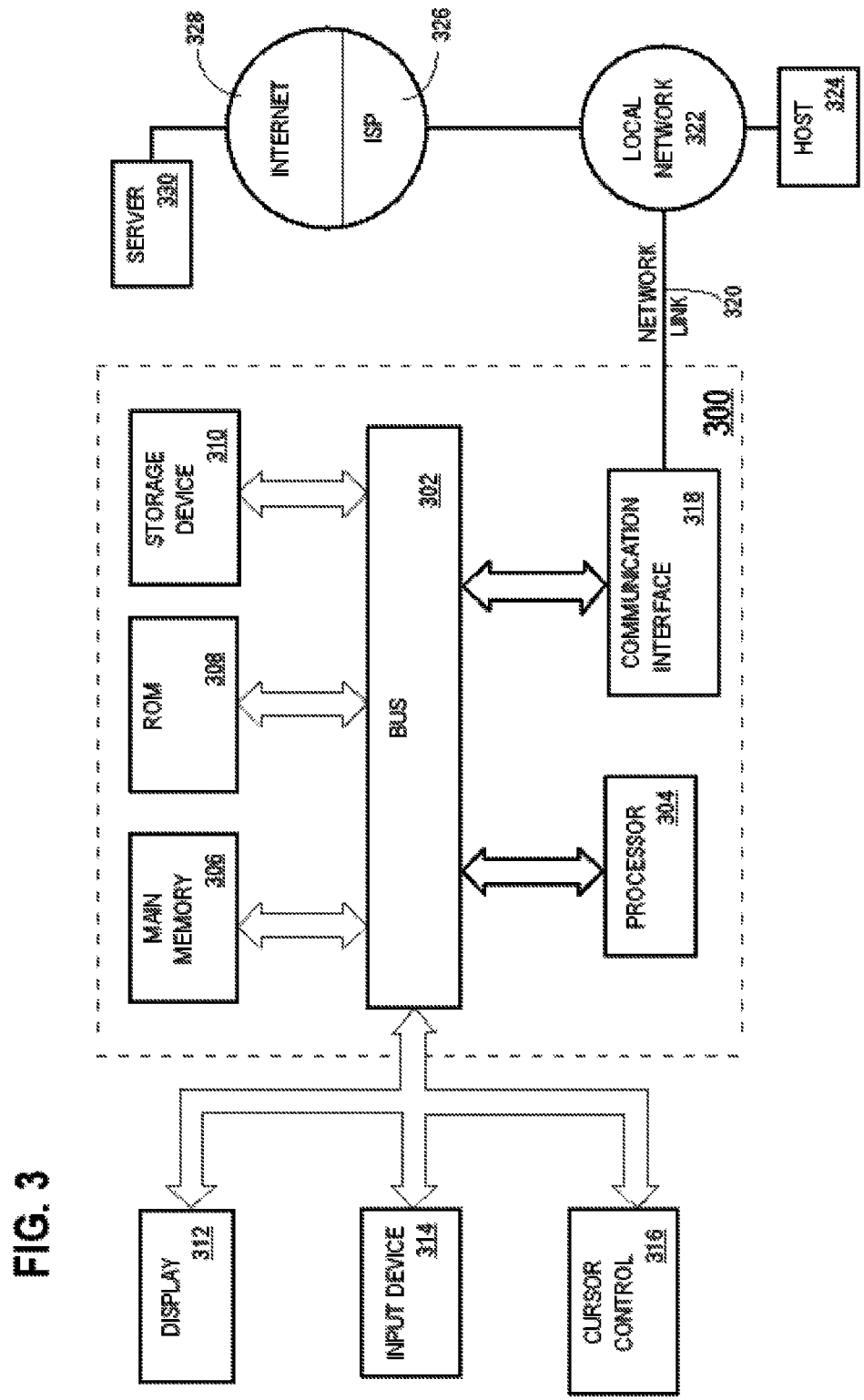
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "third," and "particular" are used as naming conventions to distinguish different queries, steps, objects, devices, or other items from each other, so that these different items may be referenced after they have been introduced. The use of these terms does not imply an ordering or timing.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first query;
   transforming the first query, comprising an outer query that includes a selection of a subquery that (a) returns at most one row and (b) includes a first predicate that references a database object that is from the outer query and outside the subquery, to a second query that includes:
      a second predicate that corresponds to the first predicate, wherein the second predicate references an outer join, wherein the second query does not select any subquery having the first predicate or the second predicate, and wherein the second query is semantically equivalent to the first query;

causing execution of the second query instead of the first query;
wherein the method is performed by one or more computing devices.

2. The method of claim 1, wherein the subquery returns at most a value of a single cell that is in the at most one row and a single column.

3. The method of claim 1, wherein the subquery references two or more database objects, wherein transforming the first query to the second query comprises adding a view, wherein the second predicate references the view.

4. The method of claim 1, wherein the subquery includes an aggregation operator, wherein transforming the first query to the second query comprises adding a view, wherein the view includes an added GROUP BY clause, and wherein the second predicate references the view.

5. The method of claim 1, wherein the subquery appears in a SELECT clause of the outer query, and wherein the outer query selects a result of the subquery.

6. The method of claim 1, wherein the subquery includes a first set of two or more predicates that reference one or more database objects that are not in the subquery, wherein the second query includes a second set of two or more predicates that correspond to the first set of two or more predicates, wherein the second set of two or more predicates are not in the subquery.

7. The method of claim 1, wherein the second query does not include any correlated predicates.

8. The method of claim 1, wherein the second query, if executed, would cause a temporary organization of data from the database object and utilization of the temporary organization of data to evaluate multiple rows of a join operation as part of determining the at most one row.

9. One or more non-transitory computer-readable storage media storing instructions which, when executed by one or more computing devices, cause:
receiving a first query;
transforming the first query, comprising an outer query that includes a selection of a subquery that (a) returns at most one row and (b) includes a first predicate that references a database object that is from the outer query and outside the subquery, to a second query that includes:
a second predicate that corresponds to the first predicate, wherein the second predicate references an outer join, wherein the second query does not select any subquery having the first predicate or the second predicate, and wherein the second query is semantically equivalent to the first query;
causing execution of the second query instead of the first query.

10. The one or more non-transitory computer-readable storage media of claim 9, wherein the subquery returns at most a value of a single cell that is in the at most one row and a single column.

11. The one or more non-transitory computer-readable storage media of claim 9, wherein the subquery references two or more database objects that are not in the subquery, wherein transforming the first query to the second query comprises adding a view, wherein the second predicate references the view.

12. The one or more non-transitory computer-readable storage media of claim 9, wherein the subquery includes an aggregation operator, wherein transforming the first query to the second query comprises adding a view, wherein the view includes an added GROUP BY clause, and wherein the second predicate references the view.

13. The one or more non-transitory computer-readable storage media of claim 9, wherein the subquery appears in a SELECT clause of the outer query, and wherein the outer query selects a result of the subquery.

14. The one or more non-transitory computer-readable storage media of claim 9, wherein the subquery includes a first set of two or more predicates that reference one or more database objects that are not in the subquery, wherein the second query includes a second set of two or more predicates that correspond to the first set of two or more predicates, wherein the second set of two or more predicates are not in the subquery.

15. The one or more non-transitory computer-readable storage media of claim 9, wherein the second query does not include any correlated predicates.

16. The one or more non-transitory computer-readable storage media of claim 9, wherein the second query, if executed, would cause a temporary organization of data from the database object and utilization of the temporary organization of data to evaluate multiple rows of a join operation as part of determining the at most one row.

17. A method comprising:
receiving a first query;
transforming the first query, comprising an outer query that includes a selection of a subquery that (a) returns at most one row and (b) includes a first predicate that references a database object that is from the outer query and outside the subquery, to a second query that includes:
a second predicate that corresponds to the first predicate, wherein the second predicate references an outer join, wherein the second query does not select any subquery having the first predicate or the second predicate, and wherein the second query is semantically equivalent to the first query;
generating an execution plan for executing the second query instead of the first query;
wherein the method is performed by one or more computing devices.

18. The method of claim 17, wherein the subquery returns at most a value of a single cell that is in the at most one row and a single column.

19. The method of claim 17, wherein the subquery references two or more database objects, wherein transforming the first query to the second query comprises adding a view, wherein the second predicate references the view.

20. The method of claim 17, wherein the subquery includes an aggregation operator, wherein transforming the first query to the second query comprises adding a view, wherein the view includes an added GROUP BY clause, and wherein the second predicate references the view.

21. The method of claim 17, wherein the subquery appears in a SELECT clause of the outer query, and wherein the outer query selects a result of the subquery.

22. The method of claim 17, wherein the subquery includes a first set of two or more predicates that reference one or more database objects that are not in the subquery, wherein the second query includes a second set of two or more predicates that correspond to the first set of two or more predicates, wherein the second set of two or more predicates are not in the subquery.

23. The method of claim 17, wherein the second query does not include any correlated predicates.

24. The method of claim 17, wherein the second query, if executed, would cause a temporary organization of data from the database object and utilization of the temporary organization of data to evaluate multiple rows of a join operation as part of determining the at most one row.

25. One or more non-transitory computer-readable storage media storing instructions which, when executed by one or more computing devices, cause:
- receiving a first query;
- transforming the first query, comprising an outer query that includes a selection of a subquery that (a) returns at most one row and (b) includes a first predicate that references a database object that is from the outer query and outside the subquery, to a second query that includes:
  - a second predicate that corresponds to the first predicate, wherein the second predicate references an outer join, wherein the second query does not select any subquery having the first predicate or the second predicate, and wherein the second query is semantically equivalent to the first query;
- generating an execution plan for executing the second query instead of the first query.

26. The one or more non-transitory computer-readable storage media of claim 25, wherein the subquery returns at most a value of a single cell that is in the at most one row and a single column.

27. The one or more non-transitory computer-readable storage media of claim 25, wherein the subquery references two or more database objects that are not in the subquery, wherein transforming the first query to the second query comprises adding a view, wherein the second predicate references the view.

28. The one or more non-transitory computer-readable storage media of claim 25, wherein the subquery includes an aggregation operator, wherein transforming the first query to the second query comprises adding a view, wherein the view includes an added GROUP BY clause, and wherein the second predicate references the view.

29. The one or more non-transitory computer-readable storage media of claim 25, wherein the subquery appears in a SELECT clause of the outer query, and wherein the outer query selects a result of the subquery.

30. The one or more non-transitory computer-readable storage media of claim 25, wherein the subquery includes a first set of two or more predicates that reference one or more database objects that are not in the subquery, wherein the second query includes a second set of two or more predicates that correspond to the first set of two or more predicates, wherein the second set of two or more predicates are not in the subquery.

31. The one or more non-transitory computer-readable storage media of claim 25, wherein the second query does not include any correlated predicates.

32. The one or more non-transitory computer-readable storage media of claim 25, wherein the second query, if executed, would cause a temporary organization of data from the database object and utilization of the temporary organization of data to evaluate multiple rows of a join operation as part of determining the at most one row.

* * * * *